United States Patent [19]

Whitehouse

[11] Patent Number: 4,892,376

[45] Date of Patent: Jan. 9, 1990

[54] OPTICAL BACKPLANE FOR CIRCUIT BOARDS

[75] Inventor: William A. Whitehouse, Poulsbo, Wash.

[73] Assignee: The Boeing Company, Seattle, Wash.

[21] Appl. No.: 301,852

[22] Filed: Jan. 26, 1989

[51] Int. Cl.[4] .............................................. G02B 6/36
[52] U.S. Cl. .................................. 350/96.20; 250/227; 455/617
[58] Field of Search .......................... 350/96.15, 96.20; 250/227, 551, 239, 237 R; 307/311; 455/605, 606, 607, 612, 617

[56] References Cited

U.S. PATENT DOCUMENTS

| | | | |
|---|---|---|---|
| 4,408,354 | 10/1983 | Culshaw et al. ................ | 455/617 X |
| 4,432,604 | 2/1984 | Schwab ....................... | 350/96.20 X |
| 4,733,093 | 3/1988 | Graves et al. ................. | 250/227 X |
| 4,817,204 | 3/1989 | Jannelli et al. ................ | 455/617 X |

FOREIGN PATENT DOCUMENTS 0028240  2/1986  Japan ................................. 455/600

*Primary Examiner*—William L. Sikes
*Assistant Examiner*—Akm E. Ullah
*Attorney, Agent, or Firm*—Indyk, Pojunas & Brady

[57] ABSTRACT

An optical backplane comprises a light source that transmits a light beam through apertures of aligned circuit cards. An optical modulator on each circuit card writes information onto the light beam. An optical demodulator on each circuit card reads information off of the light beam. The optical backplane interconnects integrated circuits of different circuit cards and minimizes misalignment problems and the likelihood of faulty connections between such circuits.

9 Claims, 3 Drawing Sheets

OPTICAL BACKPLANE FOR CIRCUIT BOARDS

FIELD OF THE INVENTION

The invention relates to a backplane for connecting printed circuit cards. More specifically, the invention relates to a backplane for optically connecting integrated circuits mounted on different printed circuit cards.

BACKGROUND OF THE INVENTION

Printed circuit cards support elements of electronic circuitry in various types of electrical equipment. For instance, circuit cards in a personal computer support a number of integrated circuits. The integrated circuits supported upon one circuit card send data comprising binary words to the integrated circuits of another circuit card through a data bus comprising an electrical backplane. The electrical backplane physically and electrically connects the integrated circuits of one circuit card with the integrated circuits of another circuit card.

FIG. 1 shows a prior art electrical backplane 10 connecting integrated circuits 11 of one circuit card 12 with the integrated circuits 13 of another circuit card 14. Each integrated circuit 11 or 13 has multiple terminal pins 15 or 16 that are connected to an edge connector 17 o 18 by a corresponding number of electrical conductors 19 or 20, for instance. The electrical conductors 19 or 20 comprise conductive traces that have been deposited on the circuit card 12 or 14, for instance. The electrical conductors 19 or 20 carry bits of a binary word in parallel from the terminal pins 15 of one integrated circuit 11 to the edge connector 17 mounted on the edge of the circuit card 12. The edge connector 17 mates with an electrical backplane connector 21. The electrical backplane connector 21, or 22, and wires or conductive traces on the backplane 10 comprises an electrical backplane such as a VME bus (IEEE P1014/D1), which carries the binary word from the edge connector 17 of the circuit card 12 to edge connectors, such as 18, of other circuit cards, such as 14. FIG. 1 only shows the interconnection between a pair of such circuit cards 12 and 14 for clarity. Electrical conductors deposited on other such circuit cards carry the binary bits from each edge connector to other integrated circuits on other circuit cards.

The terminal pins 15 of each integrated circuit 11 are typically connected such that the 1st, 2nd, ... and nth terminal pins of one integrated circuit 11 electrically connect to the 1st, 2nd, ... and nth terminal pins of another integrated circuit. Thus, when one integrated circuit 11 produces a binary word having a low bit at the 2nd terminal pin, for instance, the voltage of the 2nd terminal pin of each electrically connected integrated circuit 11 on circuit card 12 is pulled low and a low bit appears at the 2nd terminal pin of each integrated circuit. The binary word represents data, an address, or a control command sent to or from each integrated circuit.

The electrical connection between each edge connector 17 or 18 and the electrical backplane connector 10 can be misaligned during assembly of electrical equipment. The electrical connection between each edge connector 17 or 18 and the electrical backplane connector 10 can also loosen when electrical equipment is frequently moved. Misaligned or loose electrical connections result in short or open circuits and, thus, ineffective equipment.

A need exists for an apparatus that interconnects integrated circuits of different circuit cards and minimizes misalignment and the likelihood of faulty connections between such circuits.

SUMMARY OF THE INVENTION

The invention concerns an apparatus comprising a chassis, a first circuit card mounted on the chassis, first circuitry mounted on the first circuit card, a second circuit card mounted on the chassis, second circuitry mounted to the second circuit card, and a means for optically transmitting information from the first circuitry to the second circuitry.

In a preferred embodiment, the means for optically transmitting information comprises a light source for generating a light beam and passing this light beam through the proper aperture on the first circuit card to the second circuit card, an optical modulator on the first circuit card for writing information onto the light beam, and an optical demodulator on the second circuit card for reading information off of the light beam.

DETAILED DESCRIPTION OF THE INVENTION

Figure 1:
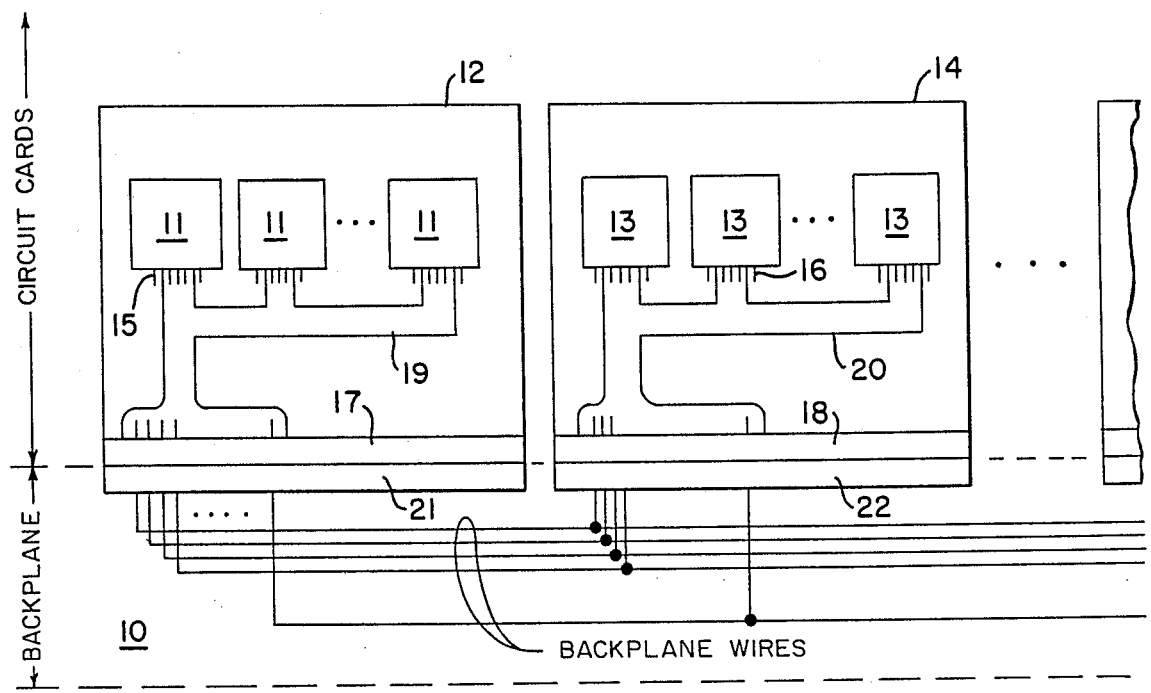
FIG. 1 shows a prior art electrical backplane.
Figure 2:
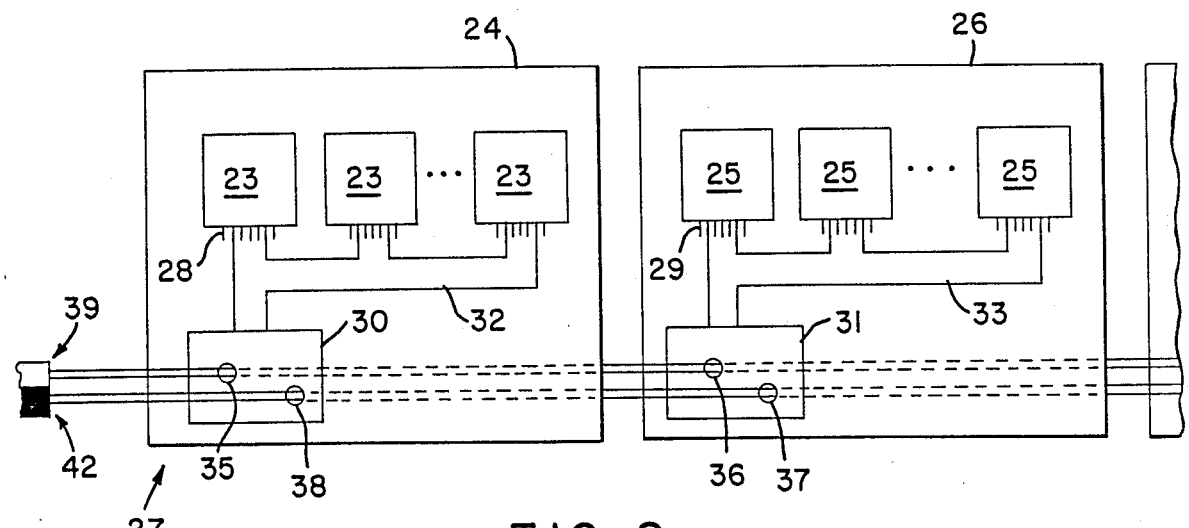
FIG. 2 illustrates integrated circuits of one circuit card connected to the integrated circuits of another circuit card with an optical backplane according to this invention.

FIG. 2 shows integrated circuits 23 of one circuit card 24 connected to the integrated circuits 25 of another circuit card 26 with an optical backplane 27. Each integrated circuit 23 or 25 has multiple terminal pins 28 or 29 that are connected to a backplane integrated circuit 30 or 31 through a corresponding number of electrical conductors 32 or 33, for instance. The electrical conductors 32 and 33 comprise conductive traces that have been deposited on the circuit card 24 or 26, for instance. The electrical conductors 32 carry bits of a binary word in parallel from the terminal pins 28 of one integrated circuit 23 to the backplane integrated circuit 30. The optical backplane 27 comprises a backplane integrated circuit 30 mounted on each circuit card, such as 24, and a light emitter 34 mounted on a chassis wall 39 of FIG. 3 that generates a light beam which passes through each backplane integrated circuit 30 and 31, for instance.

According to this invention, the light emitter 34 generates a light beam perpendicular to a number of circuit boards 24 and 26, which parallel one another. The light emitter 34 comprises a laser or a focused light source. FIG. 2 shows circuit cards 24 and 26 parallel to the beam for clarity. The light beam passes through an optical modulator 35 of the backplane integrated circuit 30. The optical modulator 35 writes a binary word onto the light beam by interfering with and modulating the intensity or frequency of the light beam as discussed concerning FIGS. 4, 5A, and 5B. The optical modulator 35 comprises a liquid crystal device or a spectral filter, for instance. The light beam continues through a similar optical modulator 36 of each backplane integrated circuit 31 mounted on each circuit card 26, for instance. Any optical modulator 30 or 31 can write a binary word onto the light beam.

Figure 3:
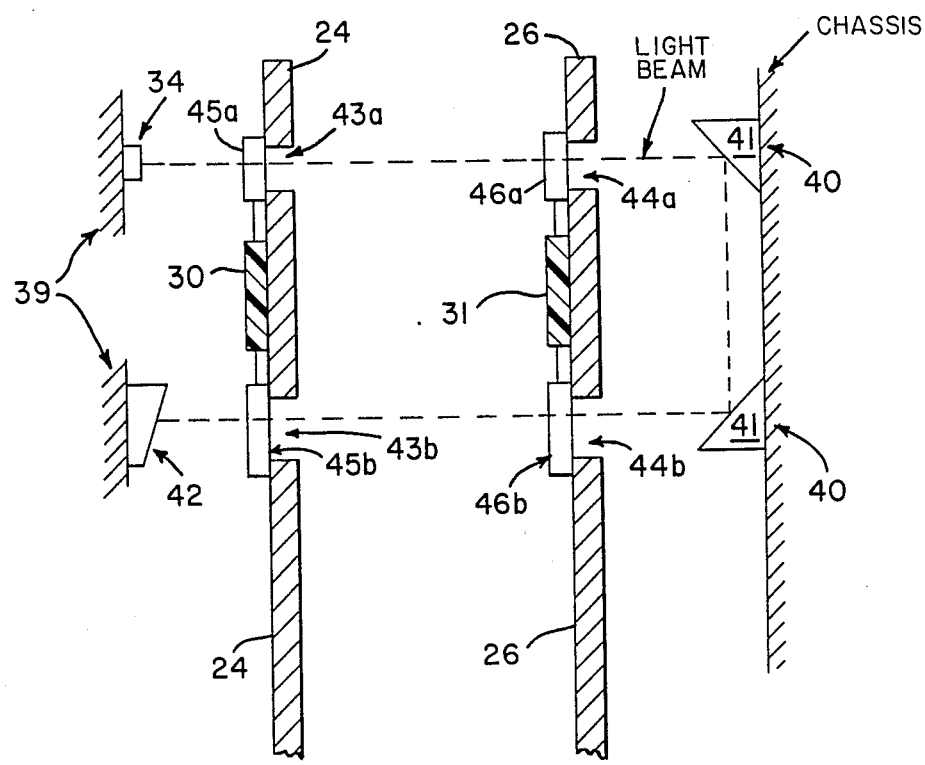
FIG. 3 shows a sectional sideview of the circuit cards of FIG. 2.

The light beam then reaches a reflector assembly 40 of FIG. 3. The reflector assembly reflects the light beam back through an optical demodulator 37 and 38 of each backplane integrated circuit 30 and 31. The optical demodulators 37 and 38 read a binary word from the modulated light beam as discussed concerning FIGS. 4, 5A, and 5B. The optical demodulator 37 or 38 comprises a beam splitter and a pin diode which splits a 10 decibel signal from the light beam and reads the beam. Circuitry within the backplane integrated circuit 30 or 31 detect and connect the electrical signal to proper backplane circuit pins. Electrical conductors 32 and 33 deposited on each circuit card 24 and 26 carry the binary word read by each optical demodulator 37 and 38 from the backplane circuit to each integrated circuit on other circuit cards.

The terminal pins 28 and 29 of integrated circuits 23 and 25 are properly connected and data is written onto and read from the light beam such that the 1st, 2nd, .. . and nth terminal pins 28 of an integrated circuit 23 on one circuit card 24 are optically connected to the 1st, 2nd, ... and nth terminal pins 29 of an integrated circuit 25 on another circuit card 26. Thus, when one integrated circuit 23 produces a binary word having a low bit at the 2nd terminal pin 28, for instance, the voltage of the 2nd terminal pin 29 of each optically connected integrated circuit 25 is pulled low and a low bit appears at the 2nd terminal pin 29 of each integrated circuit 25. The binary word represents data, an address, or a control command sent to or from each integrated circuit. Power signals are distributed to each integrated circuit by electrical conductors in a known manner.

FIG. 3 shows a sectional side view of the circuit cards 24 and 26 of FIG. 2. Printed circuit cards 24 and 26 are mounted on a common chassis 39 so windows of the backplane integrated circuit of each circuit card 24 and 26 are aligned. The circuit cards 24 and 26 parallel each other and are perpendicular to the light beam. In this manner, the light beam from the light emitter passes sequentially through the optical modulator 35 and 36 of each backplane integrated circuit 30 and 31 on each circuit card 24 and 26 to the reflector assembly 40. The reflector assembly 40 comprises two optical prisms 41 or highly reflective surfaces. The reflector assembly 40 reflects the light beam back through the optical demodulators 37 and 38 of each circuit card 26 or 24 to a black target 42. The black target 42 absorbs the light beam so that the light beam does not reflect within the chassis and produce stray signals. Such stray signals might be misinterpreted as data signals by the optical demodulators 37 and 38. Ambient light within the chassis is negligible compared to the intensity of the light beam from the light emitter 34. Frequency filters at the optical demodulators 37 and 38 distinguish between ambient light and the light beam.

In the FIG. 3 embodiment, each circuit card 24 has two holes 43a and 43b and each chip casing that covers each backplane integrated circuit 30 has two windows 45a and 45b. The two holes 43a and 43b of the circuit card 24 align separately with the two windows 45a and 45b of each backplane integrated circuit 30. One window 45a is part of the optical modulator 35 of the backplane integrated circuit 30. The other window 45b comprises an optical detector or photodetector and is part of the optical demodulator 38 of the backplane integrated circuit 30. The other circuit card has two holes 44a and 44b that align with two windows 46a and 46b of the backplane integrated circuit 31. The window 46a is part of the optical modulator 36 of the backplane integrated circuit 31 and the window 46b is a photodetector composing part of the optical demodulator 37 of the backplane integrated circuit 31. The windows, optical modulator, and optical demodulator are large compared to the light beam diameter. Thus, the light beam passes through each window and connects the circuitry of different circuit cards, even if the circuit cards 24 and 26 have been misaligned when mounted to the chassis. The windows 45a and 46a of the optical modulator and the windows 45b and 46b of the optical demodulator are adhesively secured or hermetically sealed in the holes 43a, 43b, 44a, and 44b of the backplane integrated circuits 30 and 31, respectively. In another embodiment, the backplane integrated circuits 30 and 31 have no windows, and optical modulators and optical demodulators are elements separate from the backplane integrated circuit 30 or 31. Each backplane integrated circuit is electrically connected to control such optical modulators and optical demodulators, which are mounted directly in the holes 43a, 43b, 44a, and 44b of the circuit cards 24 and 26.

Figure 4:
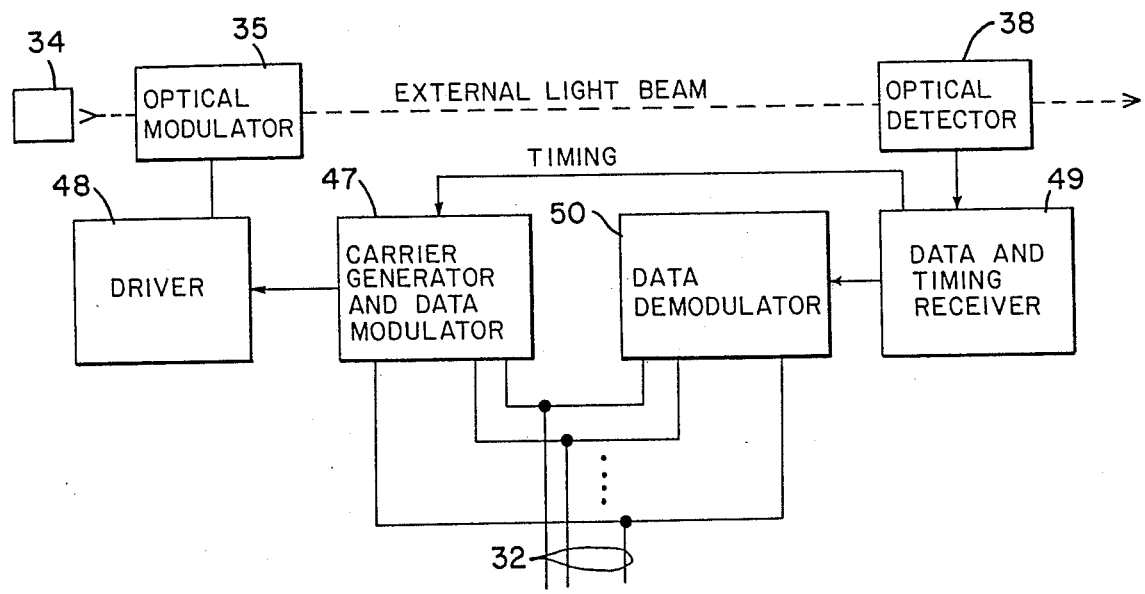
FIG. 4 shows a schematic diagram of circuitry comprising a control portion of the optical backplane.

FIG. 4 shows a block diagram of circuitry and elements composing one typical backplane integrated circuit, such as 30 of FIG. 2 and 3. The light beam from a light emitter 34 passes through an optical modulator 35. The optical modulator 35 is mounted directly in a window of the chip casing that covers the backplane integrated circuit 31. When an integrated circuit 23, such as central processing unit, co-processor or Memory Management Unit, shown in FIG. 2, writes a binary word, the electrical conductors 32 carry the binary word to a data modulator circuit 47. The data modulator circuit 47 produces an output to a driver circuit 48, which drives the optical modulator 35. The driver circuit 48 varies the transparency of the optical modulator 35 to modulate the intensity or frequency of the light beam passing through the optical modulator 35. In this manner, a parallel signal, comprising bits of the binary word written by an integrated circuit, is converted into a serial signal, comprising pulses of the time modulated light beam. The driver circuit 48 comprises an amplifier circuit which switches between modulation states to activate and deactivate a liquid crystal device comprising the optical modulator 35. Alternatively, the driver circuit 48 varies filter characteristics of the optical modulator 35 to modulate the frequency of the light beam passing through the optical modulator 35.

The light beam from the light emitter 34, after being reflected, also passes through an optical demodulator 38. The optical demodulator 38 comprises a window in the chip casing that covers the backplane integrated circuit 30. When an integrated circuit, such as 23 of FIG. 2, reads a binary word, the optical demodulator 38 is responsive to the intensity or frequency modulated signal comprising the modulated light beam. A data-and-timing receiver circuit 49 receives the modulated signal and a timing signal. The timing signal is a clock signal that each integrated circuit receives from a crystal oscillator, for instance. The timing signal determines whether the data-and-timing receiver circuit 49 of a particular integrated circuit is to read or ignore data written on the light beam. A data demodulator circuit 50 reads the modulated signal, received by the data-and-timing receiver circuit 49, and produces a binary word comprising parallel bits onto electrical conductors 32. The electrical conductors 32 carry the binary word to the terminal pins 28 of an integrated circuit 23 that receives the binary word.

Figure 5A:
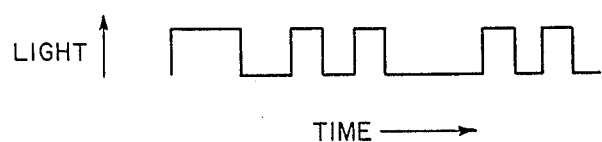
FIGS. 5A and 5B illustrate time modulation and frequency/phase modulation of optical signals with the circuitry of FIG. 4.
Figure 5B:
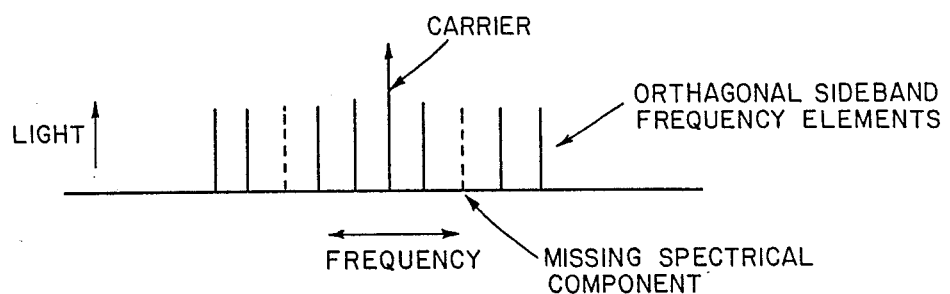

FIGS. 5A and 5B illustrate modulation of a light beam with the optical modulator 35 of FIG. 4, for instance. FIG. 5A illustrates time modulation of the light beam. Light intensity is plotted on the vertical axis and time is plotted on the horizontal axis. In this case, an optical modulator 35 alternates between transparent and opaque states according to a timed signal. The optical modulator 35 modulates the light beam between high and low intensities that respectively represent serial high and low bits of binary words comprising digital backplane signals.

FIG. 5B illustrates frequency modulation of the light beam. Light intensity is plotted on the vertical axis and frequency is plotted on the horizontal axis. In this case, an optical modulator filters spectral components from the light beam. Filtered spectral components are shown with phantom lines. The filtered spectral components represent low bits of binary words comprising digital backplane signals. Orthogonal side band frequency elements represent high level bits of such a binary word. The data modulator 47 of FIG. 4 produces a carrier signal that corresponds to a carrier frequency.

The backplane integrated circuit can carry analog signals also. The data modulator 47 of a backplane integrated circuit varies a voltage to the optical modulator 35 to change the grey scale of the light beam passing through the optical modulator. Changes in the grey scale represent different amplitudes of an analog signal.

I claim:

1. An apparatus comprising:
   a chassis;
   a first circuit card mounted on the chassis and having a first hole;
   a first circuitry mounted on the first circuit card;
   a second circuit card mounted on the chassis and having a second hole aligned with the first hole;
   second circuitry mounted on the second circuit card; and
   a means for optically transmitting information from the first circuitry to the second circuitry comprising:
      a light source that generates a light beam through the first hole of the first circuit card and the aligned second hole of the second circuit card;
      an optical modulator mounted at the first hole of the first circuit card for modulating information onto the light beam; and
      an optical demodulator mounted at the second hole of the second circuit card for receiving the light beam from the optical modulator and reading information from the light beam.

2. The apparatus of claim 1, the optical modulator comprising:
   a data modulator circuit for receiving signals from the first circuitry and producing an output, and
   a means for interfering with the light beam according to the output of the data modulator circuit.

3. The apparatus of claim 2, the optical demodulator comprising:
   an optical detector for responding to the light beam and producing an output, and
   a data demodulator circuit for producing an output to the second circuitry according to the output of the optical detector.

4. The apparatus of claim 3, the optical modulator comprising a driver circuit that receives the output of the data modulator circuit and drives the means for interfering with the light beam accordingly.

5. The apparatus of claim 4, the optical demodulator comprising a data receiver for receiving the output of the optical detector and controlling the data demodulator circuit.

6. The apparatus of claim 5, comprising a means for reflecting the light beam back through the second circuit card and through the first circuit card.

7. The apparatus of claim 6, comprising a means for absorbing the light beam reflected back through the first circuit card.

8. An apparatus comprising:
   a chassis;
   first, second and third circuit cards mounted on the chassis;
   first, second and third circuitry respectively mounted on the first, second and third circuit cards; and
   a means for optically transmitting information from the first circuitry to the second and third circuitry, wherein the means for optically transmitting information comprises:
      a light source that generates a light beam;
      an optical modulator on the first circuit card for modulating information onto the light beam; and
      first and second optical demodulators respectively on the second and third circuit cards for receiving the same light beam from the optical modulator and reading information from the same light beam.

9. The apparatus of claim 8, the first, second and third circuit cards each having a hole aligned such that the light beam passes through the first, second and third circuit cards, wherein the optical modulator is mounted at a hole of the first circuit card, and the first and second optical demodulators are respectively mounted at a hole of the second and third circuit cards.

* * * * *